United States Patent [19]

Terada et al.

[11] 3,914,458
[45] Oct. 21, 1975

[54] EDIBLE WATER IN OIL EMULSION AND METHOD FOR PREPARING THE SAME

[75] Inventors: Kimio Terada; Satoshi Fujita; Noritoki Yoshida, all of Tokyo, Japan

[73] Assignee: Asahi Denka Kogyo Kabushiki Kaisha, Japan

[22] Filed: July 19, 1973

[21] Appl. No.: 380,736

[30] Foreign Application Priority Data
July 21, 1972  Japan................................ 47-72498

[52] U.S. Cl. ................................................. 426/604
[51] Int. Cl.² ............................................ A23D 3/00
[58] Field of Search................ 260/234 R; 252/312; 426/362, 363, 339, 340, 194, 201, 202, 189, 195

[56] References Cited
UNITED STATES PATENTS

| | | | |
|---|---|---|---|
| 2,114,490 | 9/1937 | Harris | 426/201 |
| 2,223,558 | 12/1940 | Epstein | 426/189 |
| 2,422,633 | 6/1947 | Peterson | 260/234 R |
| 2,700,022 | 1/1955 | Clayton et al. | 260/234 R |
| 2,929,722 | 3/1960 | Schultz et al. | 426/201 |
| 2,999,023 | 9/1961 | Babayan et al. | 426/194 |
| 3,490,919 | 1/1970 | Horan | 426/189 |
| 3,519,436 | 7/1970 | Bauer et al. | 426/340 |
| 3,600,186 | 8/1971 | Mattson et al. | 426/194 |
| 3,682,656 | 8/1972 | Wilton | 426/189 |

Primary Examiner—Samih N. Zaharna
Assistant Examiner—Ernest G. Therkorn
Attorney, Agent, or Firm—Wenderoth, Lind & Ponack

[57] ABSTRACT

This invention relates to an edible water-in-oil (w/o) emulsion comprising (a) 75–95% of an oily phase containing a glyceride oil being liquid at 0°C as an essential constituent; (b) 5–25% of an aqueous phase containing water as an essential constituent; and (c) 0.1–3% of a sucrose fatty acid ester of HLB 1-4.

2 Claims, No Drawings

EDIBLE WATER IN OIL EMULSION AND METHOD FOR PREPARING THE SAME

Margarine is generally prepared by adding less than 22% (the term % represented here under stands for percentage by weight) of water into more than 75% of oil to make a water-in-oil (w/o) emulsion and then plasticising it by rapid cooling and, in special cases, more than 75% of oil is added to less than 22% of water to make the oil-in-water (o/w) emulsion. The aqueous phase of said ordinary (w/o) margarine contains cream, milk, skimmed milk, preservatives, table salt, perfumes, dyes, and additional emulsifiers such as monoglycerides, lecithin, sorbitan fatty acid esters. Various kinds of fats, hydrogenated oils, liquid oils and mixtures thereof have been used to stiffen, plasticise and flavor give margarine stiffness, plasticity and flavor. Unlike butter, margarine thus produced can provide different degrees of hardness and various kinds of flavor and nutriment, but in general, the appearance and hardness of ordinary margarine is made similar to that of butter.

Such margarine which is similar to butter is suitable for use as an ingredient in baking and butter cream. However this margarine is difficult to spread because of its hardness when kept in refrigerators at 0°–10°C, particularly when spread on cold, untoasted bread. The most suitable margarine is a liquid and liquid margarine can be easily preserved, weight, and supplied to mass produces of baked goods. Moreover, liquid margarine can be used for sprinkling on salads, similarly to mayonnaise, salad oil and other dressings. The margarine of this inventions which is suitable for these purposes, is an emulsion of oil and water and has the following two advantages, namely that it can contain both oil-soluble flavouring or tastable substances and water-soluble flavouring or tastable substances and that it is easy to handle. Furthermore, the liquid margarine of this invention can be used for baking. Nowadays, fluid shortening is used to produce cakes and bread in mass quantities. However, it has a disadvantage in that its fluidity decreases remarkably at temperatures of less than 10°C, because it contains a greater proportion of emulsifiers and highly hydrogenated oils. Also, since shortening does not contain water, which is very important for maintaining the activity of hydrophilic groups in emulsifiers, the emulsifiers decrease in activity, as time passes and the creaming facility is especially effected. To prevent this, a larger amount of emulsifiers and further extremely hydrogenated oils (hydrogenated vegetable or animal oils having iodine value of less than 10) must be added and this decreases the taste of the margarine itself. In order to eliminate these defects, it is recommended that margarine containing water which can maintain the activity of hydrophilic groups in emulsifiers be used. Therefore, liquid margarine is most suitable for use in baking. However, it is impossible to prevent liquid margarine stored for a long period from separating into liquid oil and water and therefore fluidic shortening rather than liquid margarine has been used in the mass production of baked goods. Though plastic margarine turns into liquid when warmed at temperatures greater than the melting point of the fat employed, its practicality is limited because of the separation of oil and water. Similarly, where water and conventional emulsifiers are added to oil, then melted blended and cooled, the separation of the two phases occurs whenever the emulsion is liquid. Much work has been done in order to eliminate these defects. For example, U.S. Pat. No. 3,519,436 discloses a method for preventing the separation of emulsion by adding water, liquid oil, perfumes and other additives, a large quantity of emulsifiers, agents assisting emulsification such as casein and skimmed milk, water thickening agents such as carboxy methyl cellurose, methyl cellurose and starch, and oil thickening agents such as highly hydrogenated oil. Further, Japanese Publication No. 6,818/71 discloses a method of stabilization of emulsion by plasticizing repeatedly by means of cooling in the production processes. The production processes in the above-mentioned methods are similar to those of the conventional plastic margarine when thickening agents and extremely hydrogenated oils together with emulsifiers are used. However, in these methods, the products obtained are substantially inferior in flavor to conventional margarine made from oils and fats, water, a small amount of emulsifiers, perfumes, tastable substances, and dyes. This is because starch or extremely hydrogenated oils mask the flavor and taste imparted by the emulsion and cause additional problem. Since the necessary amount of highly hydrogenated oil conventionally used for the stabilization of emulsion is within the range of 2 to some dozen %, the product containing 2 to some dozen % of solid fat at 0°–30°C. Moreover, since a few percent of plastic fat remains in the month at 37°C, the product does not melt immediately in the mouth and lacks the thin light taste of liquid oil. Furthermore, since it does not melt completely at gastric and intestinal temperatures, it is indigestible and lies heavy on the stomach. Therefore it is preferable that liquid margarine be composed of liquid oil, water, and a small amount of emulsifier, flavor, and dye, in the absence of flavor interrupters such as starch and highly hydrogenated oil. However when conventional food emulsifier is used it is impossible to emulsify water into liquid oil and always to maintain a uniform emulsion in spite of changes in temperature and humidity, surroundings and external vibration in transit etc. For this reason, it is necessary to use said starch and extremly hydrogenated oil. We have discovered that the addition of the sucrose fatty acid esters of HLB (Hydrophile Lipophile Balance) 1-4 is remarkably effective for preparing liquid margarine of high emulsion stability and good flavor. The present invention relates to a water-in-oil emulsion being fluid at 0°–40°C and a method of preparing it by emulsifying glyceride oils (liquid at 0°C), an aqueous water, and emulsifiers such as sucrose fatty acid esters (HLB 1-4, preferably 1.5–4.0). The margarine obtained by this invention is more palatable than conventional margarine because in this invention vegetable or animal oils which are liquid at 0°C, or a mixture thereof, are used instead of highly hydrogenated oil as used in conventional methods. Furthermore, the emulsion obtained by this invention is very stable and does not separate even at the high temperature of 40°C, because the sucrose fatty acid esters of HLB 1-4 are used as emulsifiers. In addition, a slight increase in viscosity is observed when said sucrose fatty acid esters of low HLB are added to water instead of starch, and the emulsion obtained is very stable. When it is used for cooking, a noticeable hygroscopic effect is obtained. In this invention, soyabean oil, cottonseed oil, corn oil, safflower oil, rapeseed oil, sunflower oil, sesame oil, rice bran oil, groundnut oil, Kapok oil, and the mixture thereof are used as glyceride oils fluid at 0°C. It is preferable to use glyceride oils especially obtained by winterization below 0°C and containing a very low proportion of solid fats at 0°C. The sucrose fatty acid esters of HLB 1-4 used in this invention are the mixture of 80–100% of the tri-, tetra-, and penta-esters and 20–0% of the mono- and di-esters, wherein said mono- and polyesters are prepared by reacting sucrose and saturated or un-saturated animal or vegetable fatty acids of carbon numbers 12–22. Representative examples of said fatty acid are lauric acid, myristic acid, palmitic acid, stearic acid, arachic acid, behenic acid, oleic acid, Linoleic acid, linolenic acid, gadoleic acid and erucic acid. The amount of said sucrose fatty acid ester added is 0.1–3.0%, preferably 0.3–1.0%. The emulsion is very unstable and phase separation takes place immediately after production when the conventional sucrose fatty acid esters of HLB>5 (the mixture of more than 30% of the monoester and less than 70% of the di- and triesters) is used as emulsion instead of the sucrose fatty acid esters of HLB 1-4. In this case other emulsifiers, such as small amounts of glycerine fatty acid esters, lecithin, propylene glycol fatty acid esters, sorbitan fatty acid esters, are used to improve baking and whipping properties and to control fluidity. The proportion of oily phase to aqueous phase is 75–95% to 25–5%, and preferably 75–90% to 25–10%. The production processes for preparing the emulsion of this invention are as follows:

Process (1): the process of dissolving the glyceride oil (liquid at 0°C) and 0.1–3.0% of a sucrose fatty acid ester of HLB 1-4 as an emulsifier by heating at 50°–95°C.

Process (2): the process of adding an aqueous solution to the mixture obtained in process (1) and emulsifying them. Glycerin fatty acid esters, lecithin, propyleneglycol fatty acid esters, sorbitan fatty acid esters are used as the other emulsifiers. In the emulsification of this invention, it is necessary completely to dissolve liquid oils and emulsifiers at a temperature higher than the melting points of the emulsifiers. The emulsion thus prepared is controlled within a temperature range of 40°–60°C, taken into a vessel, and allowed to stand at room temperature. In some cases, it is taken into a vessel after passing through rapidly chilling and plasticizing apparatus.

EXAMPLE 1.

| Ingredients: | Percent |
| --- | --- |
| Soyabean oil | 74 |
| Water | 21.5 |
| Table salt | 2 |
| Skimmed milk | 2 |
| Perfume | trace |

-continued

| Ingredients: | Percent |
| --- | --- |
| Dye | trace |
| Emulsifier-1* | 0.5 |

*A sucrose fatty acid ester of HLB 2 containing Ca. 5% of mono- and diesters and Ca. 95% of tri-, tetra-, and pentaesters, wherein said fatty acid is composed of Ca. 34% of palmitic acid, Ca. 59% of stearic acid, Ca. 7% of oleic acid, and a trace amount of linoleic acid.

Emulsifier-1 is dissolved in soybean oil by heating at 70°C, and then water, table salt, skimmed milk, perfume and dye are added to the prepared mixture to emulsify these ingredients. The product obtained is taken into a 500 ml bowl. The results of stabilization tests on the product as shown in Table-1.

EXAMPLE 2.

Example 1 is repeated using the same ingredients and the same amounts. After the emulsification at 60°C as in Example 1, the resulting emulsion is passed through rapidly chilling and plasticizing "votator", and taken into a 500 ml bowl. The results of stabilization tests on the products are shown in Table-1.

COMPARATIVE EXAMPLE 1.

The type and amounts of ingredients are the same as in Example 1 except that sucrose fatty acid ester of HLB Ca. 5 containing Ca. 30% of the monoester and Ca. 70% of the di- and triesters (said fatty acid is composed of Ca. 70% of stearic acid and 30% of palmitic acid) is used as an emulsifier instead of sucrose fatty acid ester of HLB 2. After the emulsification of the ingredients, as in Example 1, the resulting emulsion is taken into a 500 ml bowl. The results of stabilization tests on the product are shown in Table-1.

COMPARATIVE EXAMPLE 2.

The type and amounts of ingredients are the same as in Example 1 except that glycerine fatty acid monoester (the palmitate Ca. 30%, the stearate Ca. 70%) is used as an emulsifier instead of sucrose fatty acid ester of HLB 2. The emulsion is produced in the same manner as in Example 1 and taken into a 500 ml bowl. The results of stabilization tests on the product are shown in Table 1.

Table-1

| | | Example 1 | Example 2 | Comparative Example 1 | Comparative Example 2 |
| --- | --- | --- | --- | --- | --- |
| | 2°C | not separated | not separated | slightly separated | slightly separated |
| after one day | 20 | do | do | completely separated | completely separated |
| | 40 | do | do | do | do |
| after 10 days | 2 | do | do | do | do |
| | 20 | do | do | do | do |
| | 40 | do | do | do | do |
| after 100 days | 2 | do | do | do | do |
| | 20 | do | do | do | do |
| | 40 | slightly separated | do | do | do |

EXAMPLE 3.

| Ingredients: | |
| --- | --- |
| Cottonseed oil-1* | 582 kg |
| Emulsifier-2** | 3 |

-continued

| Ingredients: | |
|---|---|
| Milk (water content 95%) | 137 |
| Table salt | trace |
| Perfume | do |
| Dye | do |

*A transparent liquid not becoming cloudy at 0°C.
**A sucrose fatty acid ester of HLB 3 containing Ca. 7% of the mono- and diesters and Ca. 93% of tri-, tetra-, and pentaesters, wherein said fatty acid is composed of Ca. 53% of palmitic acid, Ca. 45% of stearic acid, Ca. 2% of oleic acid, and a trace amount of linoleic acid.

Emulsifier-2 is dissolved in cottonseed oil-1 by heating at 70°C and then milk, table salt, perfume, and dye are added to the prepared mixture at 60°C to emulsify these ingredients. The product obtained is taken into a vessel after being passed through a "Votator". The relationship between the viscosity and stability of the emulsion and its temperature, and the results of the palatability test on the emulsion are shown in Tables-2, 3 and 4.

COMPARATIVE EXAMPLE 3.

| Ingredients: | |
|---|---|
| Cottonseed oil-1 | 582 kg |
| Hardened cottonseed oil | 15 |
| Emulsifier-3(fatty acid monoglyceride) | 3 |
| Lecithine | 0.75 |
| Milk(water content 95%) | 137 |
| Table salt | trace |
| Perfume | do |
| Dye | do |

Cottonseed oil-1, hardened cottonseed oil, fatty acid monoglyceride, and lecithine are dissolved at 70°C and then milk, table salt, perfume, and dye are added to the prepared mixture at 60°C to emulsify them. The emulsion is passed through a "votator" and taken into a vessel. The relationship between the viscosity and stability of the emulsion and its temperature, and the results of the palatability test on the emulsion are shown in Tables-2, 3 and 4.

Table-3 shows that the product of this invention has such low viscosity values that it can be fluidized gravitationally at low temperatures and forms a stable emulsion without phase separation. However, the product of Comparative Example 3 (called conventional liquid margarine) has such high viscosity values that it can not be fluidized gravitationally at low temperatures. Though becoming fluid gravitationally at high temperatures, it forms an unstable emulsion bringing about phase separation.

Table-4

Results of Panel Test for Palatability

Number of panelists 30

(1) Twenty seven persons judged that the product of Example 3 was more palatable than that of Comparative Example 3.

(2) One person judged that the product of Comparative Example 3 was more palatable than that of Example 3.

(3) Two persons judged that both have are almost equally palatable.

Table-4 shows that the product of Example 3 is more palatable that of Comparative Example 3. All of the 27 persons who judged that the product of Example 3 was more palatable mentioned that the product of Comparative Example 3 did not melt immediately in the mouth.

What we claim is:

1. An edible liquid water-in-oil emulsion comprising (a) 75–95 % of an oily phase consisting essentially of a glyceride oil which is liquid at 0°C selected from the group consisting of soybean oil, cottonseed oil, corn oil, safflower oil, rapeseed oil, sunflower oil, sesame oil, rice bran oil, groundnut oil, kapok oil, and mixtures thereof; (b) 5–25 % of an aqueous phase consisting essentially of water and (c) 0.1–3% of a sucrose fatty acid ester of HLB 1-4 consisting essentially of (i) 80–100 % of the tri-, tetra- or penta-ester, and mixtures thereof and (ii) 0–20 % of the mono- or di-ester and mixtures thereof.

2. The emulsion of claim 1, which also contains an auxiliary emulsifier selected from a group consisting of glycerol fatty acid esters, lecithin, propylene glycol fatty acid esters, sorbitan fatty acid esters and a mixture thereof.

Table-2

| Temperature | The product of Example 3 | | The product of Comparative Example 3 | |
|---|---|---|---|---|
| | Viscosity (cps) | Emulsion stability | Viscosity (cps) | Emulsion stability |
| 2°C | 82.1 | not separated | 5500 | not separated |
| 20 | 60.5 | do | 4000 | do |
| 40 | 45.3 | do | 151.5 | slightly separated |
| 50 | 35.7 | do | 39.1 | separated |

Table-3

| Temperature | The Apparent Fluidity State of the Products. | |
|---|---|---|
| | The product of Example 3 | The product of Comparative Example 3 |
| 2°C | fluidized | not fluidized |
| 20 | excellently fluidized | do |
| 40 | do | slightly fluidized |
| 50 | do | excellently fluidized (phase separation) |

* * * * *